Patented Oct. 13, 1942

2,298,732

UNITED STATES PATENT OFFICE 2,298,732

POLYMETHINE BASE

Leslie G. S. Brooker and Frank L. White, Rochester, N. Y., assignors to Eastman Kodak Company, Rochester, N. Y., a corporation of New Jersey No Drawing. Application December 16, 1940, Serial No. 370,352

15 Claims. (Cl. 260—240)

This invention relates to polymethine dye bases and to a process for the preparation thereof.

It is known that styryl dyes can be de-quaternarized to give styryl bases. A method for accomplishing this is described in United States Patent No. 2,169,434, dated August 15, 1939. The method comprises heating the styryl dyes in a high boiling tertiary organic amine, such as diethylaniline. It is also known that cyanine dyes can be de-quaternarized to give cyanine bases. Two methods for accomplishing this have been proposed. One of these is described in the aforesaid United States Patent No. 2,169,434, and comprises heating the cyanine dyes in a high boiling tertiary amine. The second method is applicable to only certain cyanine dyes and is described in United States Patent No. 2,153,931, dated April 11, 1939. The method comprises heating, in the presence of an acid-binding substance, a quinaldine or a lepidine base with a cyclammonium quaternary salt containing, in the alpha or gamma position, an alkylmercapto or an aminovinyl group. Additional cyanine and azacyanine bases are described in United States Patent No. 2,179,990, dated November 14, 1939.

We have now found that polymethine bases can be produced from certain hemicyanine dyes, viz. those containing, attached to the omega carbon atom of the polymethine chain (i. e., the carbon atom farthest removed from the heterocyclic nucleus), an amino group of the following general formula:

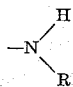

wherein R represents an aryl group. Contrary to the prior art processes our new polymethine bases are not obtained by dequaternarization. Our new bases differ, among other respects, from the known styryl bases, by containing, attached to the nitrogen atom of the heterocyclic nucleus, an organic radical, such as an alkyl or an aryl radical.

Our new bases and the process for preparing them can be illustrated for the benzothiazole series, by the following chemical equation:

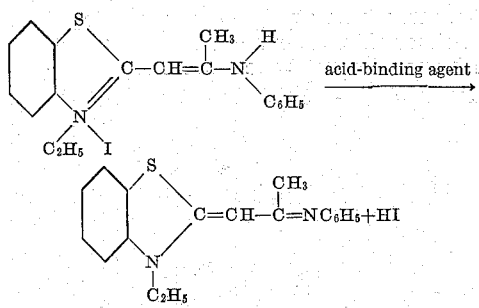

We have found that many of our new bases, particularly those containing alkyl groups on the polymethine chain, are strong sensitizers for photographic silver-halide emulsions.

It is accordingly an object of our invention to provide new polymethine bases. A further object is to provide a process for preparing such bases. A still further object is to provide photographic emulsions sensitized with such bases. Other object will appear hereinafter.

In accordance with our invention, we prepare our new polymethine bases by treating, with an acid-binding agent, a hemicyanine dye of the following general formula:

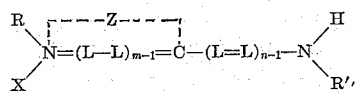

wherein L represents a methine group, $m$ represents a positive integer of from one to two, $n$ represents a positive integer of from one to four, R represents a radical selected from the group consisting of alkyl and aryl radicals, R' represents an aryl radical, X represents an acid radical, and Z represents the non-metallic atoms necessary to complete a heterocyclic organic nucleus.

In preparing our new bases, we have found that hemicyanine dyes of the above general formula, wherein X represents a halide radical, are advantageously employed.

As acid-binding agents, alkali metal hydroxides are advantageously employed. The reactions are advantageously carried out in a liquid diluent which is a solvent for the polymethine bases, but is not a solvent for the starting hemicyanine dye. Acetone is especially well suited for this purpose. Heat accelerates the formation of the polymethine bases.

The following examples illustrate the formation of our polymethine bases.

EXAMPLE 1.—*3-ethyl-2-phenyliminobenzothiazoline*

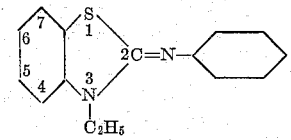

28.65 g. (1 mol.) of 2-anilinobenzothiazole ethiodide (obtained by heating 2-anilinobenzothiazole (1 mol.) and ethyl iodide (2 mol.) in a sealed tube at 105° C. for 54 hours) were suspended in 200 cc. of acetone. To this suspension were added, with stirring, 15 g. (5 mol.) of sodium hydroxide dissolved in 30 cc. of water. The resulting mixture was allowed to stand for about 10 minutes. The acetone layer was then collected and subjected to distillation to remove the acetone. The oily residue was stirred with 200 cc. of cold water. Upon chilling the resulting mixture, the oily product crystallized. The crystalline base was collected on a filter and washed with cold water. After two recrystallizations from petroleum ether, the base was obtained, in 86% yield, as colorless crystals melting at 64° to 65° C. This base had no sensitizing action on photographic silver-halide emulsions.

EXAMPLE 2.—3 - ethyl - 2 -(2 - phenyliminoethylidene) benzothiazole

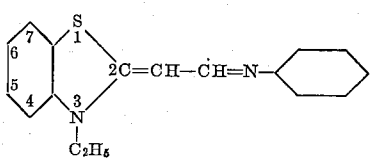

30.6 g. (1 mol.) of 2-(2-anilinovinyl)-benzothiazole ethiodide were suspended in 300 cc. of acetone. To the resulting suspension were added, with stirring, over a period of 45 minutes, 15.8 g. (5 mol.) of sodium hydroxide dissolved in 100 cc. of water. The acetone layer was collected and diluted with about 450 cc. of ice water. The yellow crystals of the polymethine base which precipitated were collected on a filter and washed with cold water. After one recrystallization from ligroin (boiling point 90° to 120° C.) the polymethine base was obtained, in 89% yield, as yellow crystals melting at 98° to 99° C., with decomposition. The base sensitized a photographic gelatino-silver-chloride emulsion to about 500 mu. with a maximum at about 460 mu.

EXAMPLE 3.—1 - methyl-4-(2 - phenyliminoethylidene)-1,4-dihydroquinoline

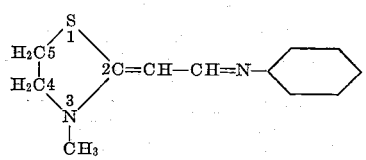

7.76 g. (1 mol.) of 4-(2-anilinovinyl)-quinoline methiodide were suspended in 75 cc. of acetone. To the resulting suspension were added, with stirring, 2.5 g. (3 mol.) of sodium hydroxide dissolved in 10 cc. of water. The acetone layer was collected and diluted with 400 cc. of cold water. The resulting suspension was chilled at 0° C. for a few hours and the solid polymethine base was then collected on a filter and washed with cold water. After two recrystallizations from ligroin (boiling point 90° to 120° C.), the polymethine base was obtained, in 65% yield, as red crystals melting at about 80° C., with previous softening and decomposition. The base sensitized a photographic gelatino-silver-chloride emulsion from about 440 mu. to about 550 mu. with a maximum at about 520 mu.

EXAMPLE 4.—3 - methyl- 2 -(2-phenyliminoethylidene)-thiazolidine

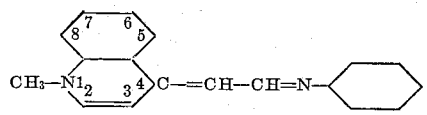

6.92 g. (1 mol.) of 2-(2-anilinovinyl)-thiazoline methiodide were suspended in 75 cc. of acetone. To the resulting suspension were added, with stirring, 2.5 g. (3 mol.) of sodium hydroxide dissolved in 10 cc. of water. The acetone layer was collected and diluted with about 400 cc. of cold water. A sticky product separated. After chilling the resulting mixture at 0° C. for several hours, the aqueous layer was decanted. The residue was stirred with cold water and the crystalline polymethine base was filtered off and washed with cold water. After two recrystallizations from ligroin (boiling point 90° to 120° C.) the polymethine base was obtained, in 73% yield, as cream colored crystals melting at 99° to 100° C.

EXAMPLE 5.—1 - ethyl - 2 -(2 - phenyliminoethylidene) -1,2-dihydroquinoline

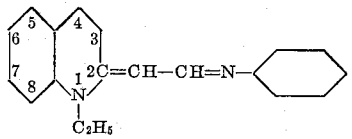

8.04 g. (1 mol.) of 2-(2-anilinovinyl) quinoline ethiodide were suspended in 100 cc. of acetone. To the resulting suspension were added, with stirring, 4 g. (5 mol.) of sodium hydroxide dissolved in 50 cc. of water. The resulting mixture was stirred until there was no more suspended solid. The acetone layer was then collected and stirred with about 600 cc. of cold water. After chilling the resulting mixture for about 12 hours at 0° C., the black solid polymethine base was collected on a filter and washed with cold water. The base dissolved readily in hot ligroin (boiling point 90° to 120° C.), and upon rapid chilling of the resulting solution, the base separated out as reddish crystals. These latter crystals were collected on a filter, and before they could be thoroughly washed, they darkened and became sticky. The sticky material was dried over paraffin wax in a vacuum desiccator. This base sensitized a photographic gelatino-silver-chloride emulsion from about 440 mu. to 510 mu. with a maximum at about 480 mu.

EXAMPLE 6.—1 - ethyl - 2 -(2 - phenyliminoethylidene) -β-naphthothiazoline

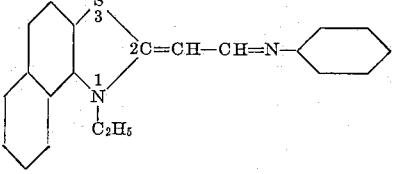

6.54 g. (1 mol.) of 2-(2-anilinovinyl)-β-naphthothiazole ethiodide were suspended in 200 cc. of acetone. To the resulting suspension were added, with stirring, 3 g. (5 mol.) of sodium hydroxide dissolved in 25 cc. of water. The resulting mixture was stirred until there was no suspended solid. The acetone layer was then collected and stirred with about 100 cc. of cold water. After chilling the resulting mixture for a few hours, the solid polymethine base was collected on a filter and washed with water. After three recrystallizations from acetone, the base was obtained, in 56% yield, as dull yellow crystals melting at 164° to 166° C., with decomposition. The base sensitized a photographic gelatino-silver chloride emulsion out to about 530 mu. with a maximum at about 500 mu.

EXAMPLE 7. — 3-ethyl-2-[2-(β-naphthylimino) propylidene] benzothiazoline

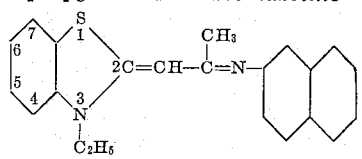

2.36 g. (1 mol.) of 2-[2-(β-naphthylamino)

propenyl]-benzothiazole ethiodide were suspended in 75 cc. of acetone. To the resulting suspension were added, with stirring, .3 g. (1.5 mol.) of sodium hydroxide dissolved in 5 cc. of water. The resulting mixture was allowed to stand at 20° to 25° C. with frequent stirring for 2 hours. The acetone layer was collected and treated with cold water to precipitate the polymethine base. After chilling this aqueous acetone mixture at 0° C. for several hours, the solid base was collected on a filter and washed with cold water. After two recrystallizations from ligroin (boiling point 90° to 120° C.), the base was obtained, in 75% yield, as yellow crystals melting at 130° to 131° C. The base sensitized a photographic gelatino-silver-chloride emulsion out to about 500 mu. with a maximum at about 450 mu.

EXAMPLE 8. — 1-ethyl-2-[2-(β-naphthylimino) propylidene]-β-naphthothiazoline

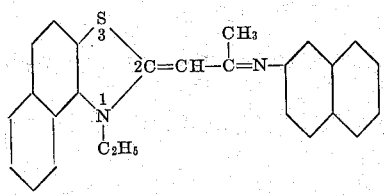

5.22 g. (1 mol.) of 2-[2-(β-naphthylamino) propenyl]-β-naphthothiazole ethiodide were suspended in 350 cc. of acetone. To the resulting suspension were added, with stirring, 0.44 g. (1.1 mol.) of sodium hydroxide dissolved in 25 cc. of water. The resulting mixture was stirred until there was no suspended solid. The acetone layer was then collected and treated with 1 liter of cold water to precipitate the polymethine base. The resulting mixture was chilled at 0° C. for several hours, after which the base was collected on a filter and washed with cold water. After three recrystallizations from ligroin (boiling point 90° to 120° C.) the base was obtained, in 42% yield, as pale yellow crystals melting at 201° to 202° C. The base sensitized a photographic gelatino-silver-chloride emulsion to about 510 mu. with a maximum at about 460 mu.

EXAMPLE 9.—2-[2-(p-anisylimino) propylidene]-1-ethyl-β-naphthothiazoline

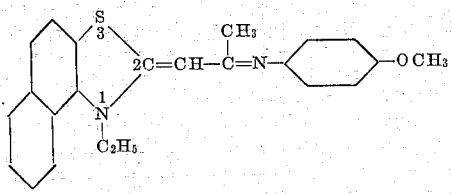

5.02 g. (1 mol.) of 2-[2-(p-anisidino) propenyl]-β-naphthothiazole ethiodide were suspended in 350 cc. of acetone. To the resulting suspension were added, with stirring, a solution of 0.44 g. (1.1 mol.) of sodium hydroxide dissolved in 25 cc. of water. The resulting mixture was stirred until there was no suspended solid. The acetone layer was then collected and diluted with 1 liter of cold water to precipitate the polymethine base. The resulting mixture was chilled at 0° C. for several hours. The base was then filtered off and washed with cold water. After two recrystallizations from ligroin (boiling point 90° to 120° C.), the base was obtained, in 18% yield, as yellow needles melting at 179° to 180° C. The base sensitized a photographic gelatino-silver-chloride emulsion to about 510 mu. with a maximum at about 480 mu.

EXAMPLE 10. — 1-ethyl-2-[2-(p-tolylimino) propylidene]-β-naphthothiazoline

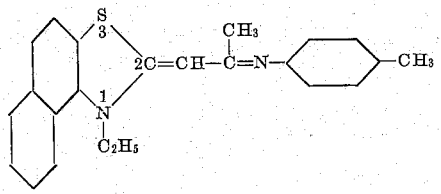

4.86 g. (1 mol.) of 2-[2-(p-toluino) propenyl]-β-naphthothiazole ethiodide were suspended in 500 cc. of acetone. To the resulting suspension were added, with stirring, 0.44 g. (1.1 mol.) of sodium hydroxide dissolved in 25 cc. of water. The resulting mixture was stirred until there was no suspended solid. The acetone layer was then collected and diluted with 1500 cc. of cold water to precipitate the polymethine base. The resulting mixture was chilled at 0° C. for several hours, after which the base was collected on a filter and washed with cold water. After two recrystallizations from ligroin (boiling point 90° to 120° C.), the base was obtained, in 71% yield, as deep yellow crystals melting at 189° to 190° C. The base sensitized a photographic gelatino-silver-chloride emulsion to about 510 mu. with a maximum at about 460 mu.

EXAMPLE 11.—2-[2-(p-chlorophenylimino) butylidene]-3-ethylbenzoselenazoline

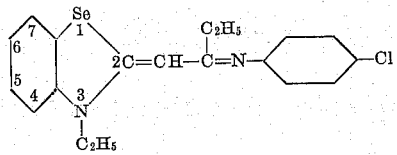

2.59 g. (1 mol.) of 2-[2-(p-chloroanilino)-1-butenyl]-benzoselenazole ethiodide were suspended in 75 cc. of acetone. To the resulting suspension were added, with stirring, 0.23 g. (1.1 mol.) of sodium hydroxide dissolved in 5 cc. of water. The resulting mixture was stirred until there was no suspended solid. The acetone layer was then collected and diluted with 500 cc. of cold water to precipitate the polymethine base. After chilling the resulting mixture for a few hours at 0° C., the base was collected on a filter and washed with cold water. After two recrystallizations from ligroin (boiling point 90° to 120° C.), the base was obtained as pale yellow crystals melting at 88° to 89° C. This base did not appear to sensitize photographic gelatino-silver-halide emulsions.

EXAMPLE 12. — 1-ethyl-2-(2-phenyliminopropylidene)-β-naphthothiazoline

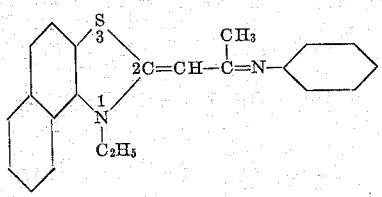

11.8 g. (1 mol.) of 2-(2-anilinopropenyl)-β-naphthothiazole ethiodide were suspended in 300 cc. of acetone. To the resulting suspension were added, with stirring, 5 g. (5 mol.) of sodium hydroxide dissolved in 25 cc. of water. The resulting mixture was warmed gently, under reflux, with stirring, for 20 minutes. The yellow acetone layer was collected and stirred with 600 cc. of water. The solid polymethine base was then collected on a filter and washed with cold water. After two recrystallizations from acetone, the base was obtained as yellow crystals melting at 166° to 167° C. The base sensitized a photographic gelatino-silver-chloride emulsion out to 510 mu. with a maximum at about 470 mu.

EXAMPLE 13.—*3-ethyl-2-(4-phenylimino-2-butenylidene)-benzothiazoline*

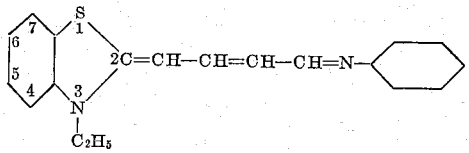

21.7 g. (1 mol.) of 2-(4-anilino-1,3-butadienyl)-benzothiazole ethiodide were suspended in 300 cc. of acetone. To the resulting suspension were added, with stirring, 10.5 g. (5 mol.) of sodium hydroxide dissolved in 50 cc. of water. After the resulting mixture had stood for 45 minutes, the acetone layer was collected and stirred with 400 cc. of cold water. The resulting mixture was chilled at 0° C. for 2 hours, and then the brown solid polymethine base was collected on a filter and washed with water. After two recrystallizations from ligroin (boiling point 90° to 120° C.) the base was obtained as orange brown needles melting at 109° to 110° C., with decomposition. The base sensitized a photographic gelatino-silver-chloride emulsion to 600 mu. with a maximum at about 560 mu.

EXAMPLE 14.—*3-ethyl-2-(6-phenylimino-2,4-hexadienylidene)-benzothiazoline*

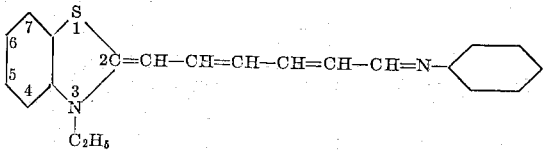

2.5 g. (1 mol.) of 2-(6-anilino-1,3,5-hexatrienyl)-benzothiazole ethiodide were placed in a solution of 0.36 g. (1 mol.) of potassium hydroxide dissolved in 95% ethyl alcohol. The mixture was boiled, under reflux, for 5 minutes. The resulting mixture was diluted with 50 cc. of cold water to precipitate the polymethine base. The resulting aqueous mixture was chilled at 0° C. The solid was collected on a filter and washed with cold water. The washed solid was extracted with 200 cc. of ligroin (boiling point 90° to 120° C.). Upon chilling the ligroin extract a dark sticky product separated. The ligroin was decanted and the residue was dissolved in 75 cc. of ligroin and the ligroin solution chilled at 0° C. The brown crystals which separated had a melting point of 117° to 119° C., with decomposition. The base sensitized a photographic gelatino-silver-chloride emulsion from about 610 mu. to about 660 mu. with a maximum at about 640 mu.

In a manner similar to that illustrated in Example 2, 3-phenyl-2-(2-phenylimino-ethylidene) benzothiazole can be prepared from 2-(2-anilinovinyl))-benzothiazole pheniodide. 2-(2-anilinovinyl)-benzothiazole pheniodide can be prepared by condensing 2-methyl benzothiazole pheniodide with diphenyl-formamidine. 2-methyl benzothiazole pheniodide can be prepared by hydrolyzing 2-dicarbethoxymethylene-3-phenylbenzothiazoline, in the presence of hydrochloric acid, and converting the resulting phenochloride to the pheniodide, as described in the copending application of L. G. S. Brooker and W. W. Williams, Serial No. 353,500, filed August 21, 1940.

The hemicyanine dyes employed in Examples 7 to 12 can be prepared as described in the copending application of L. G. S. Brooker and F. L. White, Serial No. 330,580, filed April 19, 1940, by treating a cyclammonium quaternary salt containing, in the alpha position, a chlorophopenyl group or a chloro-1-butenyl group, with a primary aromatic amine.

In the preparation of photographic emulsions containing the herein described polymethine bases, it is only necessary to disperse the bases in the emulsion. It is convenient to add the bases to the emulsions from solutions in appropriate solvents. Acetone has proven satisfactory as a solvent for the bases.

Sensitization by means of these bases is, of course, primarily directed to the ordinarily employed gelatino-silver-halide developing-out emulsions. The bases are especially useful for the sensitization of silver chloride emulsions, although those bases containing the longer polymethine chains can be used to sensitize silver bromide (including bromiodide)) emulsions. In the case of either kind of emulsion, the bases are advantageously incorporated in the washed, finished emulsions and should, of course, be uniformly distributed throughout the emulsions.

The concentration of the bases in the emulsions can vary widely, i. e., from about 5 to about 100 mg. per liter of flowable emulsion. The concentration of the base will vary according to the type of light-sensitive material in the emulsion and according to the effect desired. The suitable and most economical concentration for any given emulsion will be apparent to those skilled in the art upon making the ordinary tests and observation customarily employed in the art of emulsion making.

To prepare a gelatino-silver-halide emulsion sensitized with one of these bases, the following procedure is satisfactory. A quantity of the base is dissolved in acetone or other suitable solvent and a volume of this solution (which may be diluted with water) containing from 5 to 100 mg. of base is slowly added to about 1,000 cc. of gelatino-silver-halide emulsion, with stirring. Stirring is continued until the base is uniformly distributed throughout the emulsion. With most of these sensitizing bases 25 to 35 mg. of base per liter of emulsion suffices to produce the maximum sensitizing effect with the ordinary gelatino-silver-chloride emulsion. With the ordinary gelatino-silver-bromiodide emulsion somewhat smaller concentrations in most instances suffices to produce the optimum sensitizing effect.

The above statements are only illustrative and are not to be understood as limiting our invention, as it will be apparent that these bases can be incorporated by other methods in the photographic silver halide emulsions customarily employed in the art. For instance; the bases may be incorporated by bathing a plate or film upon which an emulsion has been coated, in a solution of the base in an appropriate solvent. Bathing methods, however, are not to be preferred ordinarily.

Our new bases can be used in the preparation of light filters and to color yarns, such as cellulose acetate yarn.

What we claim as our invention and desire to be secured by Letters Patent of the United States is:

1. A polymethine base of the following general formula:

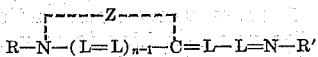

wherein L represents a methine group, $n$ represents a positive integer of from 1 to 2, R represents a radical selected from the group consisting of alkyl and aryl radicals, R' represents an aryl radical, and Z represents the non-metallic atoms necessary to complete a heterocyclic organic nucleus.

2. A polymethine base of the following general formula:

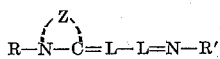

wherein L represents a methine group, R represents a radical selected from the group consisting of alkyl and aryl radicals, R' represents an aryl radical and Z represents the non-metallic atoms necessary to complete a heterocyclic organic nucleus.

3. A polymethine base of the following general formula:

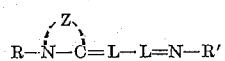

wherein L represents a methine group, R represents an alkyl radical, R' represents an aryl radical and Z represents the non-metallic atoms necessary to complete a heterocyclic organic nucleus.

4. A polymethine base of the following general formula:

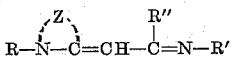

wherein R and R'' represent alkyl radicals, R' represents an aryl radical and Z represents the non-metallic atoms necessary to complete a heterocyclic organic nucleus.

5. A polymethine base of the following general formula:

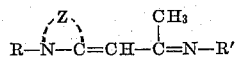

wherein R represents an alkyl radical, R' represents an aryl radical and Z represents the non-metallic atoms necessary to complete a heterocyclic organic nucleus.

6. A polymethine base of the following general formula:

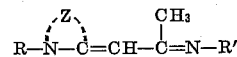

wherein R represents an alkyl radical, R' represents a β-naphthyl radical and Z represents the non-metallic atoms necessary to complete a β-naphthothiazole nucleus.

7. 1 - ethyl - 2 - [ 2 -(β-naphthylimino) propylidene]-β-naphthothiazoline.

8. A polymethine base of the following general formula:

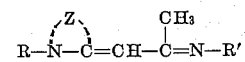

wherein R represents an alkyl radical, R' represents an aryl radical of the benzene series, and Z represents the non-metallic atoms necessary to complete a β-naphthothiazole nucleus.

9. 1-ethyl-2-[2-(p-tolylimino)propylidene]-β-naphthothiazoline.

10. A polymethine base of the following general formula:

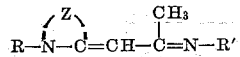

wherein R represents an alkyl radical, R' represents a β-naphthyl radical and Z represents the non-metallic atoms necessary to complete a benzothiazole nucleus.

11. 3 - ethyl - 2 - [2-(β-naphthylimino)propylidene] benzothiazoline.

12. A process for preparing a polymethine base comprising splitting out the elements of acid with an acid-binding agent, a hemicyanine dye of the following general formula:

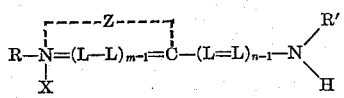

wherein L represents a methine group, $m$ represents a positive integer of from one to two, $n$ represents a positive integer of from one to four, R represents a radical selected from the group consisting of alkyl and aryl radicals, R' represents an aryl group, X represents an acid radical, and Z represents the non-metallic atoms necessary to complete a heterocyclic nucleus, in the presence of a liquid which is a solvent for the polymethine base but not for the hemicyanine dye, said liquid being present in an amount sufficient to dissolve the polymethine base.

13. A process for preparing a polymethine base comprising splitting out the elements of acid with an acid-binding agent from a hemicyanine dye of the following general formula:

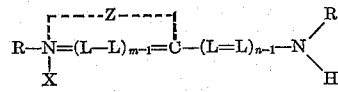

wherein L represents a methine group, $m$ represents a positive integer of from one to two, $n$ represents a positive integer of from one to four, R represents a radical selected from the group consisting of alkyl or aryl radicals, R' represents an aryl group, X represents an acid radical, and Z represents the non-metallic atoms necessary to complete a heterocyclic nucleus, in the presence of sufficient acetone to dissolve the polymethine base.

14. A process for preparing a polymethine base comprising splitting out the elements of acid with an alkali metal hydroxide from a hemicyanine dye of the following general formula:

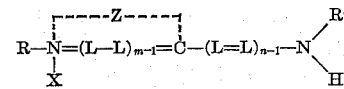

wherein L represents a methine group, $m$ represents a positive integer of from one to two, $n$ represents a positive integer of from one to four, R represents a radical selected from the group consisting of alkyl or aryl radicals, R' represents an aryl group, X represents an acid radical, and Z represents the non-metallic atoms necessary to complete a heterocyclic nucleus, in the presence of a liquid which is a solvent for the polymethine base but not for the hemicyanine dye, said liquid being present in an amount sufficient to dissolve the polymethine base.

15. A process for preparing a polymethine base comprising splitting out the elements of acid with an alkali metal hydroxide, in the presence of acetone, a hemicyanine dye of the following general formula:

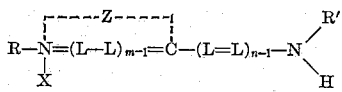

wherein L represents a methine group, $m$ represents a positive integer of from one to two, $n$ represents a positive integer of from one to four, R represents a radical selected from the group consisting of alkyl or aryl radicals, R' represents an aryl group, X represents an acid radical, and Z represents the non-metallic atoms necessary to complete a heterocyclic nucleus, in the presence of sufficient acetone to dissolve the polymethine base.

LESLIE G. S. BROOKER.
FRANK L. WHITE.